(12) United States Patent
Saito et al.

(10) Patent No.: US 7,702,163 B2
(45) Date of Patent: Apr. 20, 2010

(54) IMAGE SIGNAL PROCESSING APPARATUS, CAMERA SYSTEM AND IMAGE SIGNAL PROCESSING METHOD

(75) Inventors: Masatake Saito, Saitama (JP); Takeo Tsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 11/402,853

(22) Filed: Apr. 13, 2006

(65) Prior Publication Data
US 2006/0233446 A1 Oct. 19, 2006

(30) Foreign Application Priority Data
Apr. 18, 2005 (JP) ............................... 2005-119739

(51) Int. Cl.
*G06K 9/36* (2006.01)
(52) U.S. Cl. ..................................... 382/232
(58) Field of Classification Search ......... 382/232–233, 382/236, 238–253; 348/384.1–421.1; 375/240.01–240.25; 358/426.01–426.14
See application file for complete search history.

(56) References Cited

U.S. PATENT DOCUMENTS

| | | | | |
|---|---|---|---|---|
| 5,231,484 A * | 7/1993 | Gonzales et al. | ....... | 375/240.04 |
| 5,751,359 A * | 5/1998 | Suzuki et al. | .......... | 375/240.03 |
| 5,892,847 A * | 4/1999 | Johnson | ...................... | 382/232 |
| 6,754,279 B2 * | 6/2004 | Zhou et al. | ............. | 375/240.28 |
| 7,200,561 B2 * | 4/2007 | Moriya et al. | ................ | 704/500 |

* cited by examiner

*Primary Examiner*—Jose L Couso
(74) *Attorney, Agent, or Firm*—Rader, Fishman & Grauer PLLC

(57) ABSTRACT

An image signal processing apparatus, the method and a camera system are provided, by which highly efficient processing close to 1-path processing can be performed without deteriorating a picture quality or taking too much time for the processing, a capacity required for a compression rate, band and memory in the worst case can be assured and a random accessing property is not impaired when compressing image data: wherein a data signal processing unit performs a compression processing by dividing input image data to a plurality of bit resolution parts and applying a predetermined compression method to each divided part.

3 Claims, 11 Drawing Sheets

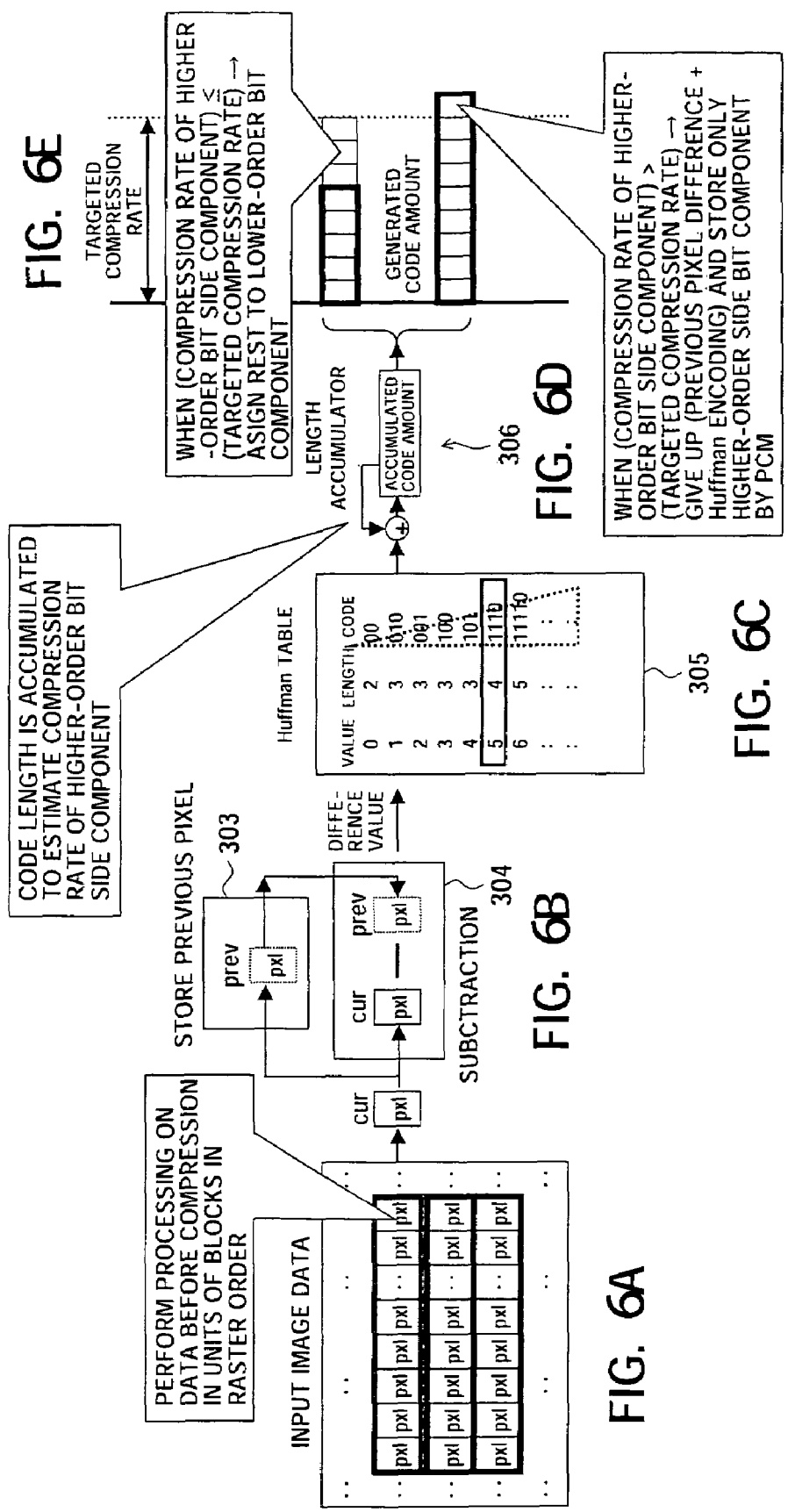

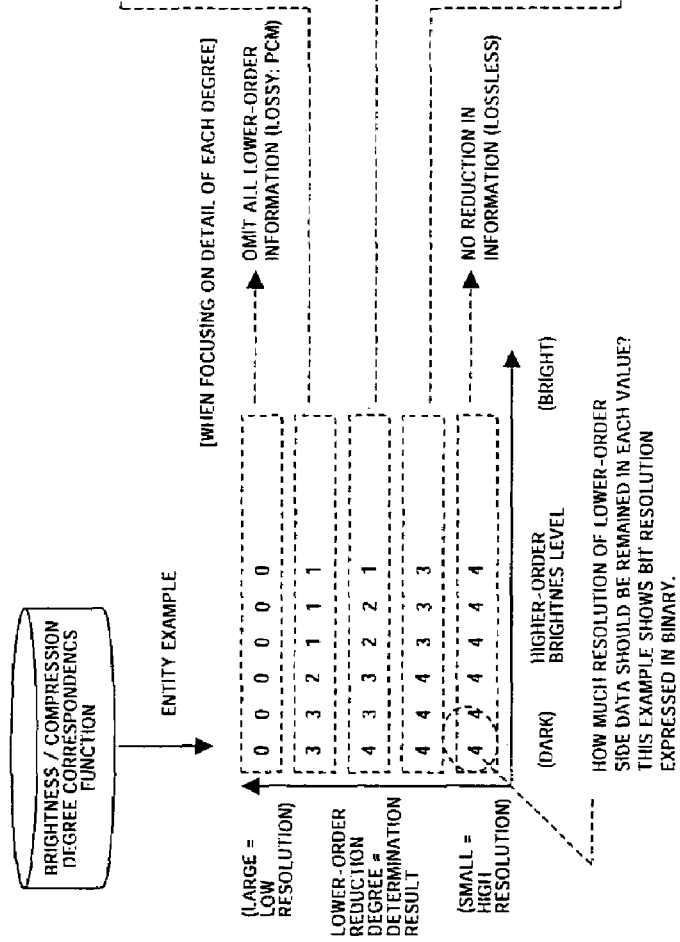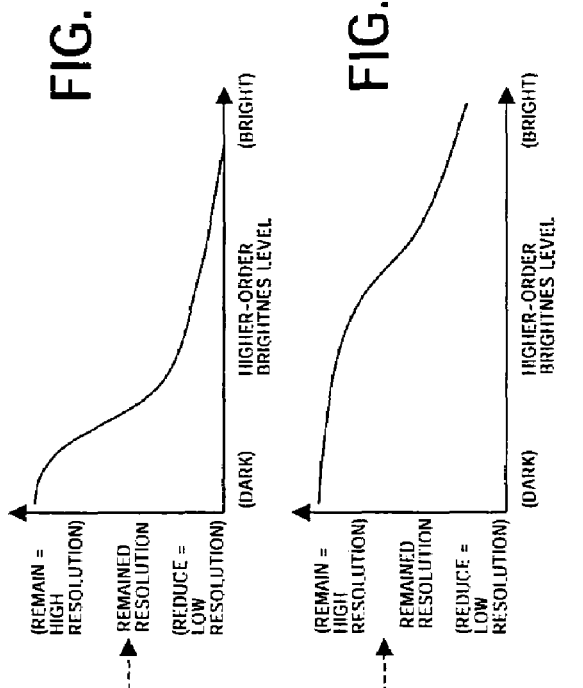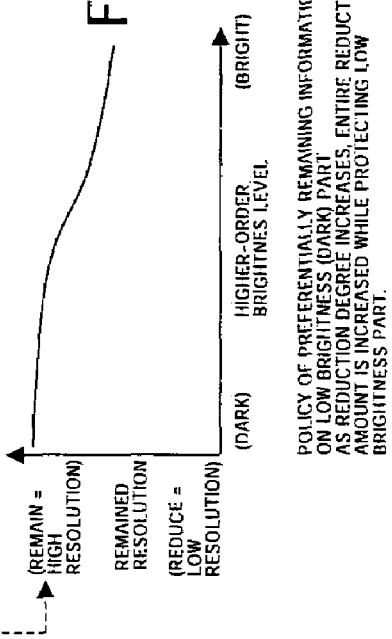

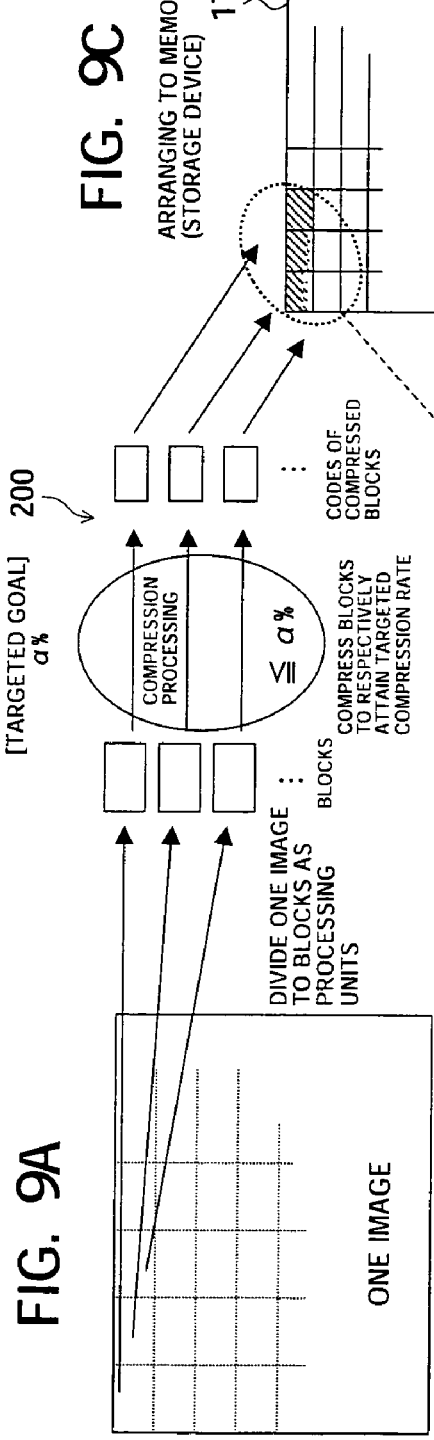
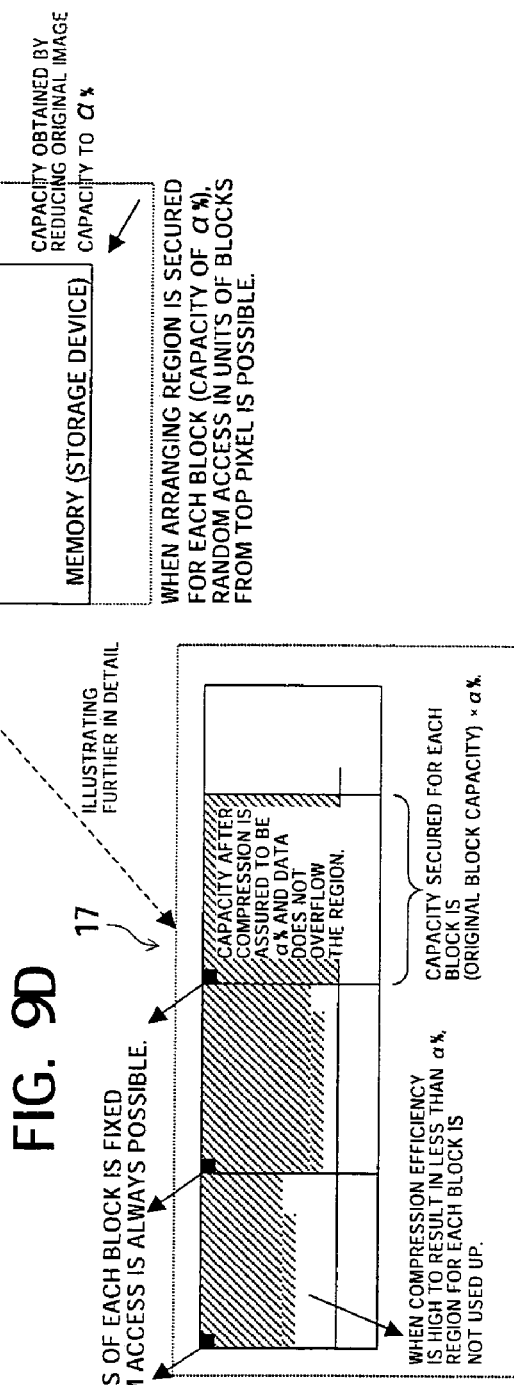

IMAGE SIGNAL PROCESSING APPARATUS, CAMERA SYSTEM AND IMAGE SIGNAL PROCESSING METHOD

CROSS REFERENCES TO RELATED APPLICATIONS

The present invention contains subject matter related to Japanese Patent Application No. 2005-119739 filed in the Japanese Patent Office on Apr. 18, 2005, the entire contents of which are incorporated herein by reference.

BACKGROUND OF THE INVENTION

1. Field of the Invention

The present invention relates to an image signal processing apparatus, a camera system and an image signal processing method, wherein an image compression technique is applied.

2. Description of the Related Art

As recent image processing apparatuses, such as a digital camera, a digital video camera and a digital television, have come to be high resolution and high definition, an amount of image data processed by an integrated circuit mounted therein has increased.

When handling enormous amounts of image data, a large amount of expensive circuit resources, such as a data bus having a wide width, a high operating frequency, and a large capacity recording device, are general required in order to secure a band of data transfer capacity in a integrated circuit.

There also arises a hurdle of high-speed performance in the recording device as the capacity becomes larger. Particularly, in a mobile phone, a personal digital assistance (PDA), a digital camera and a portable AV player and other apparatuses required to be portable, it is required that speed performance, downsizing of an area and low power consumption are balanced but it has become difficult to handle image data in mega-pixel units in recent years while satisfying all of the requirements at a higher order.

Therefore, generally, compression processing is performed on image data when recording it to a flash memory or other external recording device, for example, after finishing image processing in an integrated circuit.

Consequently, it becomes possible to store image data with a larger image size, or a lager amount of image data, and store image data for a longer time in an external recording device having the same capacity as compared with that in the case without compressing.

For realizing such compression processing, encoding methods, such as the JPEG, MPEG, GIF, LHA, ZIP, are used.

SUMMARY OF THE INVENTION

Generally, when transferring image data between a plurality of modules in an integrated circuit, as shown in FIG. 1, it is often the case that the timing of processing differs between an image data output-side module 1 and an input-side module 2. Many of such cases often transfer image data via a memory 3, as shown in FIG. 1, and the image data is temporarily stored in the memory 3.

In recent years, however, the numbers of pins that are usable as memory interfaces (I/F) of a LSI and an accessing frequency to the memory have nearly peaked, and a memory band is short in many cases.

Apart from an external recording device, when handling compressed data on a data bus or an internal recording device in an integrated circuit, the first to fourth issues described below that cannot be solved by general encoding methods arise.

The first issue is that maintenance of compression performance and image quality become difficult.

The second issue is that processing takes time and the processing speed becomes low.

The third issue is that assuring a band is difficult.

The fourth issue is that maintenance of a random accessing property becomes difficult.

Below, the first to fourth issues will be explained further in detail.

First, the first issue relates to the maintenance of compression performance and the quality of compressed data.

When trying to reduce the band by compressing data, if the compression efficiency is not good, that is, a data capacity after compression does not become very small, a reduction of the band and storage device resources cannot be attained sufficiently.

Generally, when performing lossless compression on image data, it is needless to say that it depends on respective images and mostly it is difficult to attain a capacity after compression of 50%, even in the best cases. Therefore, there is a method of using lossy compression to attain a high compression rate.

However, as is easily considered, a quality problem arises in the case of lossy compression. In the lossy compression, data after compression becomes different from the original data. If the difference is big, we see a poor picture wherein various information is lost when we see the image data. When using lossy compression, a data change only within a range that we hardly recognize the difference visually is tolerable.

The second issue is about processing speed.

No matter how excellent a worked out compression method for giving a high compression efficiency is, if the processing is too complicated and requires much circuit resource and a long processing time, an object of reducing the band cannot be attained.

For example, in a motion picture reproducing apparatus, wherein thirty images have to be displayed per second, when it is hard to process one picture in $\frac{1}{30}$ second, it cannot be mentioned that the band is reduced even though the data compression is successful, so that the initial object is not attained.

In general broadcast data, there are cases where a relatively long time may be taken for compression as far as expansion of compressed data can be finished within a limited time.

In this case, 2-path image processing may be performed. Namely, all image data are scanned in processing on the first path to extract an image characteristic amount that is available for compression processing, for example, brightness of the whole screen, and particularly, coordinate information of a complicated image part required to be fine.

In processing in the second path, efficient compression can be performed by utilizing the already obtained information from the first path.

However, in an apparatus for performing recording and reproducing at a time or when handling data in an integrated circuit, there is not enough time for such redundant inspection.

Accordingly, processing by one path where only a data scan in a very narrow range is basically permitted is preferable.

The third issue is a worst case assurance of the band.

Generally, in a variable length encoding method used for compressing various data including an image, a data capacity after compression is not determined and it is impossible to know the data capacity after compression until actually performing the compression once.

Moreover, the compression at this time utilizes probabilistic polarization, so that when handling extreme data (for example, geometric zigzag check pattern), it is logically possible that the data capacity inversely increases before the compression.

However, in an integrated circuit, only a limited amount of circuit resources based on processing data capacity estimated in advance can be used. Even in the case with the worst compression efficiency, a least assurable capacity after compression has to be determined and the capacity after compression has to reach a targeted band reduction.

Finally, the fourth issue is maintenance of a random access property.

Generally, when compressing an image, pixels on a screen are scanned in a certain order and compression processing is performed. As an example of the scan method, the "Raster scan" for scanning from the left top to the right bottom in an order of lines to columns is often used.

Inversely, when expanding compressed data, expansion is performed by following just the same pixel scanning order at the time of compression from the top of the compressed encoding data in general variable length encoding.

On the other hand, when cutting off a partial image from one image, the case requiring reference and correlation of pixels above and below and the case of performing the process of correcting deviation at a contour of an image caused by a lens at the time of capturing image, etc., the capability of freely obtaining pixels at any part is not often required.

At this time, current variable length encoding data are not capable of expanding at the middle of the encoding data to obtain a freely selected part, so that the random access property is totally lost.

This disadvantage has to be eliminated, and band consumption due to expansion from the top part, which may be caused when retrieving a certain part or a consumption of a line holding memory, has to be prevented.

It is desired to provide an image signal processing apparatus, a camera system and an image signal processing method, by which processing close to the 1-path processing can be highly effectively performed without deteriorating the image quality, the processing does not take too much time, a capacity required for the compression rate, a band and a memory in the worst case can be assured and, moreover, the random access property is not impaired.

According to the first aspect of an embodiment of the present invention, there is provided an image signal processing apparatus for performing compression processing on image data, having a signal processing unit performing compression processing by dividing input image data to a plurality of bit resolution parts and applying a predetermined compression method to each divided part.

Preferably, the signal processing unit divides image data to higher-order side bits and lower-order side bits and performs a lossless compression on the divided higher-order side bits based on a lossless compression method.

Preferably, the signal processing unit compresses input image data in units of blocks of a predetermined number of pixels.

Preferably, the signal processing unit performs a band compression processing for attaining a targeted compression rate, performs a lossless compression when the targeted compression rate is attained by a compression processing based on a lossless compression method, and performs a compression processing based on a lossy compression method only when the targeted compression rate is not satisfied by the lossless compression.

Preferably, the signal processing unit performs a band compression processing for attaining a targeted compression rate for each block, performs a lossless compression when the targeted compression rate is attained by a compression processing based on a lossless compression method, and performs a compression processing based on a lossy compression method only when the targeted compression rate is not satisfied by the lossless compression.

Preferably, the signal processing unit varies the bit resolution of pixels to be adaptive in accordance with the complexity of an image for each block.

Preferably, the signal processing unit makes a determination by a pixel value when reducing the bit resolution of pixels of lower-order bit resolution and makes a lower-order bit resolution of a low pixel value harder to be reduced than that of a high pixel value.

Preferably, the signal processing unit performs a processing of gradually reducing the bit resolution from a pixel having a high pixel value.

Preferably, the signal processing unit performs a trial calculation of an encoding amount in a plurality of reduction schemes, then adapts one to satisfy the aim, and performs actual encoding by following the reduction scheme.

Preferably, the signal processing unit stores the higher-order raw data as it is when the results of all reduction schemes are not good.

Preferably, the apparatus further includes a storage unit, and the signal processing unit performs a compression in units of blocks of the limited number of pixels and stores the same in a predetermined storing region for each of the blocks in the storage unit.

According to a second aspect of an embodiment of the present invention, there is provided a camera system, having an image capturing unit for taking an image of an object and outputting image data, and an image signal processing apparatus performing predetermined processing on the image data; wherein the image signal processing apparatus includes a signal processing unit dividing input image data to a plurality of bit resolution parts and performing a compression processing by adopting a predetermined compression method to each divided part.

According to a third aspect of an embodiment of the present invention, there is provided an image signal processing method for performing predetermined compression processing on image data, wherein input image data are divided to a plurality of bit resolution parts; and a compression processing is performed by adopting a predetermined compression method for each divided part.

BRIEF DESCRIPTION OF DRAWINGS

These and other objects and features of the present invention will become clearer from the following description of the preferred embodiments given with reference to the attached drawings, in which:

FIGS. 6A to 6E are views for explaining an encoding method of higher-order side bit components (a resolution assured part) in the present embodiment;

FIGS. 7A to 7D are views for explaining an encoding method of lower-order side bit components (a rate control part) of the present embodiment;

FIGS. 9A to 9D are views of an outline of processing of the band assuring compression method of the present embodiment;

DESCRIPTION OF THE PREFERRED EMBODIMENT

Below, an embodiment of the present invention will be explained with reference to the drawings.

Figure 1:
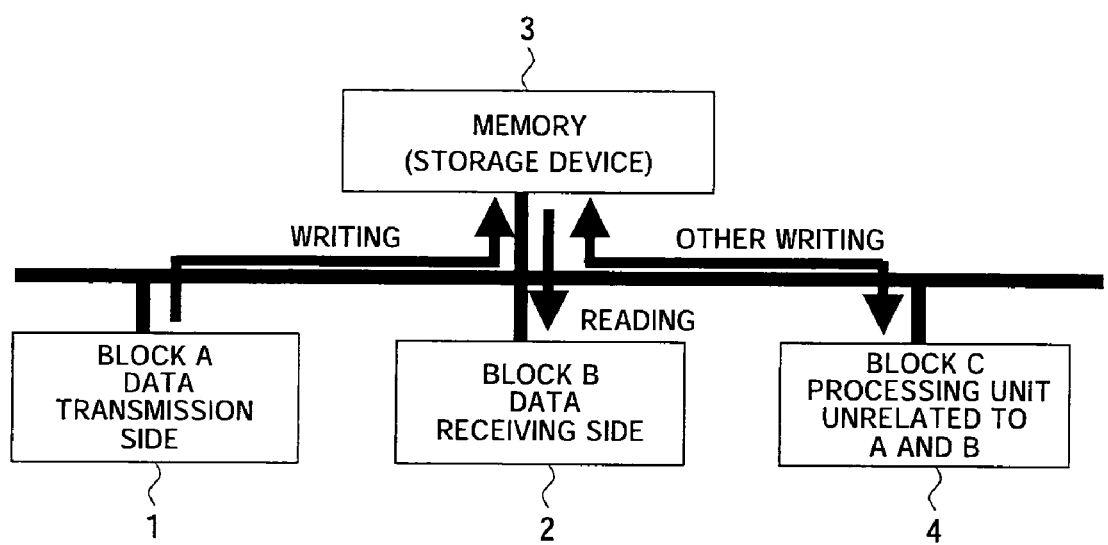
FIG. 1 is a view for explaining the data transfer configuration in a general integrated circuit.
Figure 2:
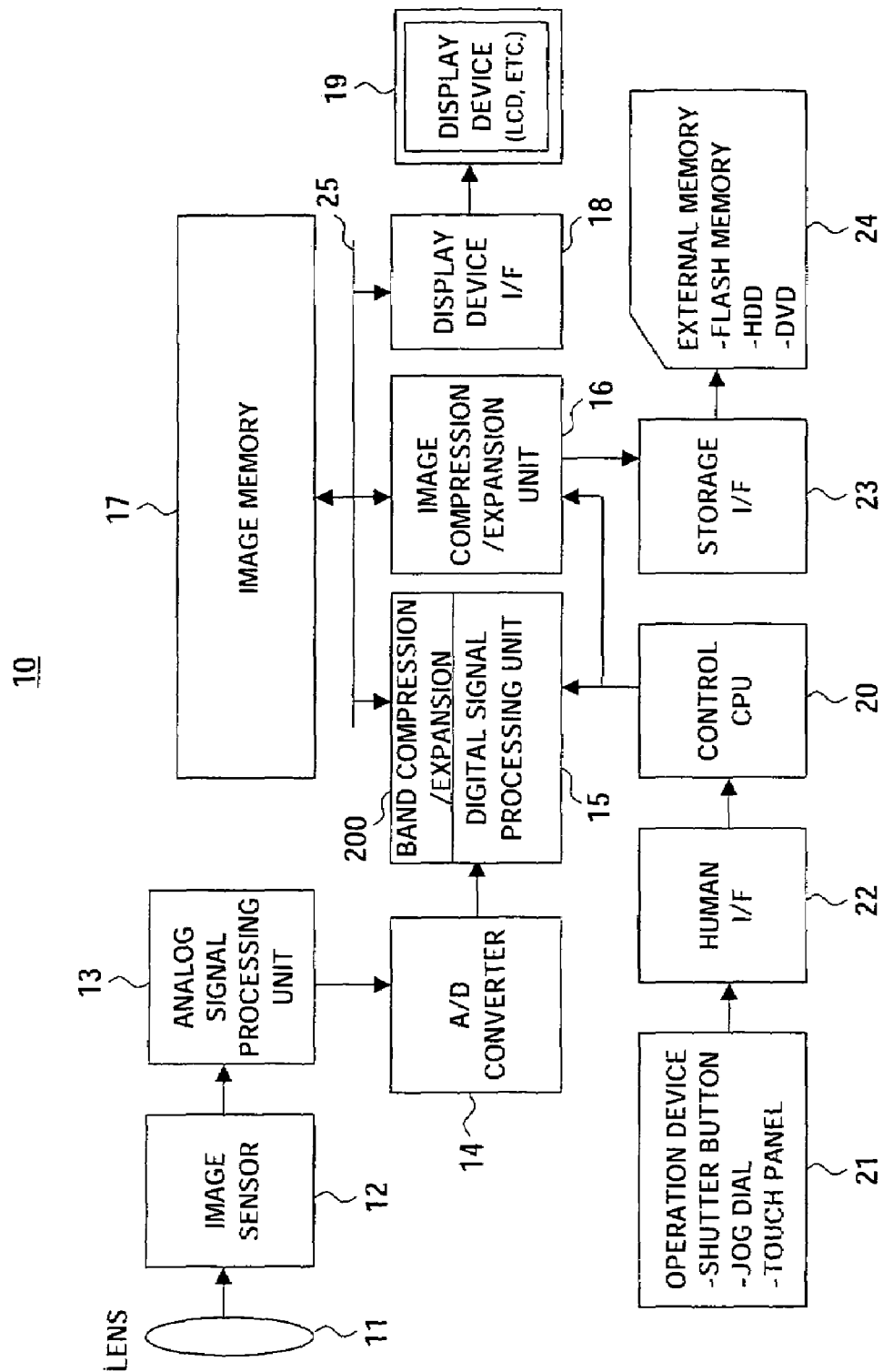
FIG. 2 is a block diagram of a configuration example of a camera system applying an image signal processing apparatus according to the present embodiment.

FIG. 2 is a block diagram of a configuration example of a camera system applying an image signal processing apparatus according to the present embodiment.

The camera system 10 includes an optical system 11, an image sensor (image pickup device) 12 composed of a CCD or a CMOS sensor, an analog signal processing unit 13, an analog/digital (A/D) converter 14, a digital signal processing unit 15, an image compression expansion unit 16, an image memory 17, a display device interface (I/F) 18, a display device 19, a control CPU 20, an operation device 21, a human interface 22, a storage interface 23, and an external image storage memory 24.

In the camera system 10, the digital signal processing unit 15, the image compression expansion unit 16, the image memory 17 and the display device interface (I/F) 18 are connected via a bus 25.

The optical system 11, the image sensor (image capturing device) 12 composed of a CCD or a CMOS sensor, and the analog signal processing unit 13, etc. compose an image pickup unit.

Basically, an image signal processing apparatus can be configured by the digital signal processing unit 15 as a first signal processing unit, the image compression expansion unit 16 as a second signal processing unit, and the image memory 17 as a memory unit.

In the present embodiment, the digital signal processing unit 15 is provided with a band assuring compression expansion unit 200 at an interface portion with the image memory 17, processing close to the 1-path processing can be performed without impairing the image quality and without taking too much time while assuring a memory bus band, a capacity required for a compression rate, a band and a memory in the worst case and the random access property is secured.

First, an outline of a function of each part of the camera system 10 in FIG. 2 will be explained.

The optical system 11 is configured by at least one lens as the main body and it focuses a not shown image of an object on a light receiving surface of the image sensor 12 as an image capturing element.

The image sensor 12 performs photoelectric conversion on information of the object image focused through the optical system 11 and outputs the converted information to the analog signal processing unit 13.

The analog signal processing unit 13 performs correlated double sampling processing (CDS) and analog amplification processing, etc. on the analog output of the image sensor 12 and outputs processed analog image data to the A/D converter 14.

The A/D converter 14 converts the analog image data from the analog signal processing unit 13 to a digital signal and outputs it to the digital signal processing unit 15.

The digital signal processing unit 15 performs processing for determining a shutter speed of shooting prior to the shooting, processing for adjusting the brightness and color of a taken image, and compression processing on the taken image data based on a later explained compression method, and writes the compressed image to the image memory 17 as a recording medium, and performs processing for reading the written image data from the image memory 17 and expanding, etc.

The digital signal processing unit 15 is provided with the band assuring compression expansion unit 200 at the interface part with the image memory 17, processing close to the 1-path processing can be performed without impairing the image quality and without taking too much time while assuring a memory bus band, a capacity required for a compression rate, band and memory in the worst case and the random access property is secured.

The specific configuration and function of the band assuring compression expansion unit 200 of the digital signal processing unit 15 will be explained in detail later on.

The image compression expansion unit 16 has a decoding function for reading compressed data stored in the image memory 17 and performing expansion processing and an encoding function for generating an image source from a plurality of image data, such as a camera signal, by performing compression signal processing.

The image compression expansion unit 16 is capable of storing image data into the image storage memory 24 through the storage interface 23 and reproducing data from the memory 24.

As the image storage memory 24, a flash memory as a nonvolatile memory, a HDD and a DVD may be applied.

The display device interface 18 outputs image data to be displayed to the display device 19 to the display.

As the display device 19, a liquid crystal display device (LCD), etc. may be applied.

The control CPU 20 controls the digital signal processing unit 15, the image compression expansion unit 16 and the entire circuit.

The control CPU 20 controls in accordance with the operation device 21 through the human interface 22.

The operation device 21 is configured by a shutter button, a jog dial and a touch panel, etc.

Below, the processing function, etc. of the band assuring compression expansion unit 200 in the digital signal processing unit 15 will be explained in detail.

Figure 3:
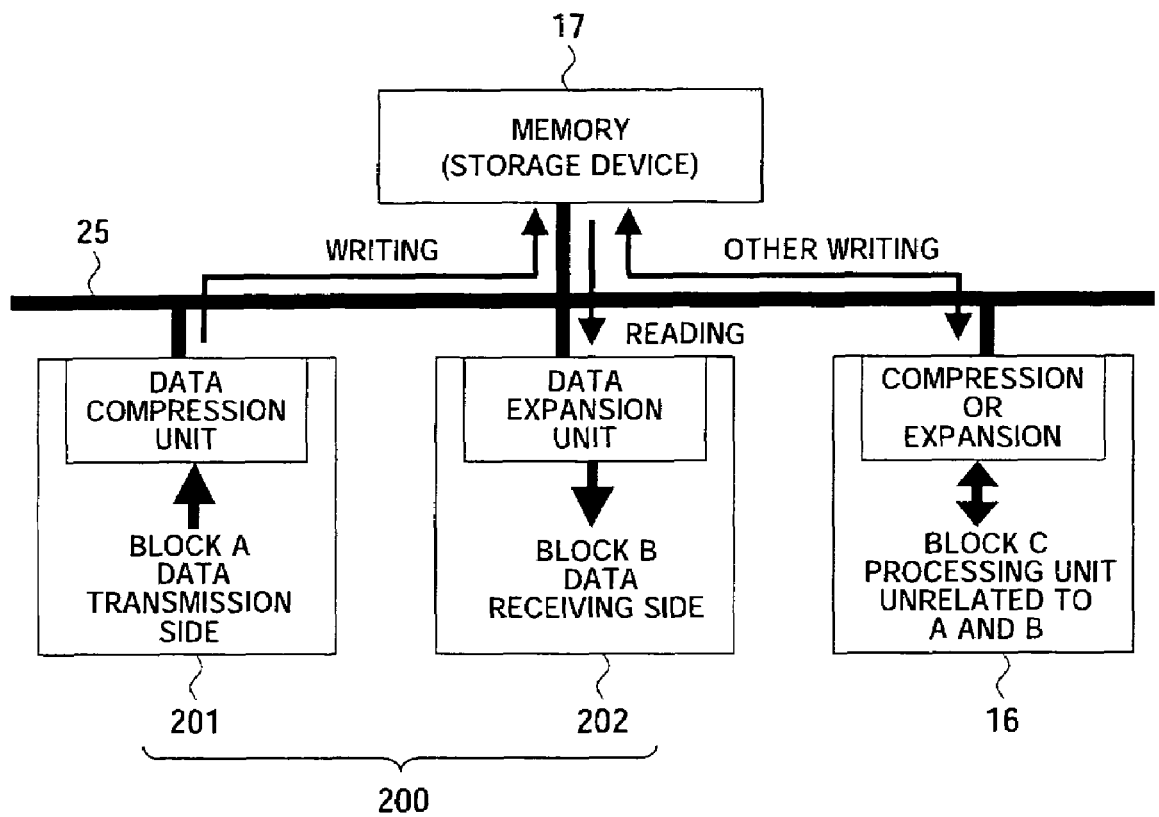
FIG. 3 is a view of a conceptual block configuration of an image signal processing apparatus including a band compression expansion unit in the present embodiment.

The band assuring compression expansion unit 200 in the present embodiment conceptually includes, as shown in FIG. 3, a data transmission side block 201 provided with a data compression unit 201a and a data receiving side block 202 provided with a data expansion unit 202a. The data transmission side block 201a and the data receiving side block 202 are connected to the image memory (memory unit) 17 through the bus 25, so that data transfer is performed.

In the present embodiment, as will be explained later on, due to the compression (expansion) processing by the band assuring compression expansion unit 200, a data amount flowing through the bus 25 is small, and a band and capacity of the memory device composing the image memory 17 can be reduced.

Also, in the present embodiment, separate from the band assuring compression expansion unit 200, the image compression expansion unit 16 is connected to the bus 25. Namely, the image compression expansion unit 16 is arranged as a function block for performing entirely different processing (irrelevant processing) from the processing in the digital signal processing unit 15, reads data from the image memory 17 and performs data transfer processing for writing.

Namely, in the present embodiment, to reduce the band of the data transfer capacity, for example, processing data is handled by compressing the capacity in the integrated circuit.

In recent years, the number of pins that are usable as memory interfaces (I/F) of an LSI and an accessing frequency to the memory have nearly peaked, and a memory band is short in many cases. When compressed image data is handled in the integrated circuit, a data amount passing through the data bus as reduced and a necessary reduction of the band can be attained. Furthermore, by compressing data, a necessary capacity of a memory device in the integrated circuit can be also reduced.

Note that, in the present embodiment, as a prerequisite, it is assumed that image data in a color filter array including respective RGB colors of 12-bit resolution is compressed to a 8-bit level in each color (a targeted compression rate is 66.7%, which is ⅔ of the original data).

As each element composing image data, those having 8-bit resolution have been used as a standard. As the component of image data, the primary colors (R, G and B), the brightness color difference (Y, Cb and Cr) and a color filter array (CFA) unique to the image sensor, etc. may be mentioned.

However, in recent years, along with demands for a higher image quality, pursuit of a higher resolution of 10 to 12 bits or higher has become significant.

In the present embodiment, a function capable of sufficiently dealing with the demands for a higher picture quality and a higher resolution is provided.

However, the data amount increases if the resolution of the image data is simply made high, which results in an increase of a memory area for storing the image data and a memory bus band for transferring the same.

Thus, the band assuring compression expansion unit 200 in the digital signal processing unit 15 of the present embodiment adopts an efficient image data compression method and has a function of attaining the four goals (A) to (D) below, wherein the disadvantages in a general image compression technique are eliminated.

[Four Goals]

(A) To maintain a high picture quality as much as possible by an encoding algorithm according to visual characteristics;

(B) To suppress an increase of a bus band by a one-path encoding method for an entire input image;

(C) To always assure a certain compression rate for any input image: and (D) Not to impair a random access property.

In the band assuring compression expansion unit 200 of the present embodiment, an image data compression method having the processing functions listed below is adopted to realize the four goals.

(1) Compression is performed in units of the limited number of pixels (a block). Due to this first function, the above four goals (A) to (D) can be attained.

(2) By realizing 1-path encoding processing for an entire image, an increase of the band is prevented. Due to this second function, the goal (B) can be attained.

(3) A high picture quality is maintained by multi-path encoding processing for each block in one image. Due to this third function, the goal (B) can be attained.

(4) By recording to an address determined for each block, the random access property is not impaired. Due to this fourth function, the goal (D) can be attained.

(5) Data is divided to a plurality of bit resolution parts: the higher-order bit side and lower-order bit side, etc., and suitable compression methods are separately used, respectively. Due to this fifth function, the goal (A) can be attained.

(6) To suppress picture quality deterioration to a minimum in a range where a targeted compression rate is satisfied, an optimal compression method is adaptively used for each block. Due to this sixth function, the goals (A) and (C) can be attained.

(7) When reducing the bit resolution of pixels, by determining based on a size of a pixel value and making bit resolution of a low brightness (pixel) value harder to be reduced than a high brightness (pixel) value, visual deterioration of the picture quality is prevented. Due to this seventh function, the goal (A) can be attained.

(8) Lossless compression is performed on the higher-order bit side to assure a minimum picture quality. When the results of all reduction measures are not good, the higher-order data is stored as it is to assure a minimum capacity after compression. Due to this eighth function, the goal (C) can be attained.

Below, the first to eighth functions will be explained further in detail.

[First Function]

To attain the goals (A), (B), (C) and (D), compression is performed in units of a limited number of pixels (a block).

Generally, neighboring pixels in image data are highly correlated. Accordingly, a method of performing highly efficient compression processing utilizing the neighboring correlation is useful in units of blocks composed of adjacent tens of pixels or so. For example, in a compression method, such as the JPEG, the compression processing is performed in units of block shapes of 8 (width)×8 (length).

In the compression method of the present embodiment, compression is performed in units of predetermined block shapes.

A shape and number of pixels of the block may be optimally selected for each system and they are not particularly limited in the present embodiment. It is preferable that they are programmable to the extent possible.

Note that in a general image compression algorithm, a compression rate of the block varies in accordance with a complexity degree of a pattern in the block. Consequently, a certain compression rate cannot be ensured for images of all complexity degrees, and the storage area and the bus band are hard to assure.

By taking this point into account, in the method of the present embodiment, the significant characteristic is that a targeted compression rate is attained for each block without fail. Namely, it is possible to assure a data amount of a memory required to store in units of blocks and a memory bus band required for transferring in units of blocks.

A targeted compression rate in units of blocks may be selected to an optimal value for each system and it is not particularly limited in the present embodiment. It is preferable that it is programmable to the extent possible.

In data compression methods there are a lossless compression method and a lossy compression method.

In the lossless compression method, the compression efficiency is sacrificed so as not to deteriorate the picture quality, while in the lossy compression method, the picture quality is deteriorated to improve the compression efficiency.

In the method of the present embodiment, a method of performing lossless compression when a targeted compression rate is satisfied by lossless compression and performing lossy compression only when a targeted compression rate cannot be satisfied by lossless compression is adopted to suppress the deterioration of picture quality to minimum.

As a typical lossless compression method, there is a lossless JPEG (JPEG Annex. H) utilizing correlation in neighbors. In the lossless JPEG, a data amount is compressed by performing Huffman encoding on a difference (DPCM) with the neighboring pixels.

As a typical lossy compression method, there is a JPEG baseline. In the JPEG baseline, a data amount is compressed by performing discrete cosine transformation (DCT), quantization and Huffman encoding in the blocks.

As an internal type (corresponding to the DPCM, DCT and Huffman, etc. explained above) used in lossless compression and lossy compression, an optimal type may be adopted for each system and it is not particularly limited in the present embodiment.

[Second Function]

To attain the goal (B), encoding processing of one path was performed for an entire image and an increase of the band is prevented.

Generally, as a method of realizing a high compression rate, there are a 2-path encoding system and a multi-path encoding system.

In the case of the 2-path encoding system, information on the distribution condition of a complexity degree of a pattern in image data is collected in processing of the first path and bit rate control is performed in the second path based on the information collected on the first path, so that a high compression rate and a high picture quality are maintained. Note that when placing image data on a memory via a bus, a memory band required for inputting the image data doubles in return.

Thus, encoding processing of one path is realized for the entire image to prevent an increase of the image data input band in the present system.

[Third Function]

To attain the goal (B), encoding processing of multiple paths is performed for each block in one image and a high picture quality is maintained.

In the present method, a multi-path encoding processing method is adopted for each block in one image. By selecting an optimal parameter by multiple paths from different compression parameters, it becomes possible to prevent the deterioration of picture quality as much as possible in a range of satisfying a certain compression rate.

The kinds and the number of the compression parameters and a selecting algorithm of an optimal parameter are not particularly limited in the present embodiment. It is preferable that it is programmable to the extent possible.

Below, a specific example of an embodiment will be explained.

By preparing in parallel a plurality of circuits for calculating a data capacity after compressing a block in arrays, it becomes possible to provisionally calculate a large number of data amount reduction schemes by different compression parameters at a time on the first path.

As a result, compression processing of the block can be realized by processing close to 2-path processing.

On the second path, an optimal compression parameter obtained from the trial calculation of the first path is used for performing actual compression processing.

[Fourth Function]

To attain the goal (D), a random access property is not impaired by recording to a predetermined address for each block.

Assuring a constant compression rate in units of blocks means actually compressing to a data amount corresponding to a targeted compression rate or smaller. Therefore, there could be the case where a room for other data is left, albeit only slightly, for the prepared data capacity to become completely full. Next, a block may be put into the room, but it is not in the present method.

The next block is recorded in a storage region secured for the next block, so that an address of top data of each block is fixed in the memory regardless of an actual compression rate of the block and random accessing in units of blocks becomes possible.

As an addressing method in units of blocks, an optimal method may be used for each system and it is not particularly limited in the present embodiment. It is preferable that it is programmable to the extent possible.

[Fifth Function]

To attain the goal (A), in the band assuring compression method of the present embodiment, data is divided to a plurality of bit resolution parts, such as a higher-order bit side and a lower-order bit side, and optimal compression methods are used separately thereon.

Generally, in image data, the correlation with neighbors declines from the higher-order bit side to the lower-order bit side. Therefore, a compression method based on neighbor correlation used in 8-bit resolution image data compression and considered to be effective is not always effective for the lower-order bit side of high resolution image data exceeding 8 bits.

Actually, when comparing compression efficiencies based on neighbor correlation of high resolution image data of 8 bits and 12 bits, there is a tendency that the compression efficiency declines as the resolution becomes higher.

Thus, the method of the present embodiment is configured so that high resolution image data is divided to a plurality of resolution parts, such as a higher-order bit side and a lower-order bit side, and an optimal compression method is used separately thereon.

As a data dividing point for dividing to the higher-order bit side and the lower-order bit side, an optimal point may be selected for each system. A dividing point and a dividing number of data are not particularly limited in the present embodiment. It is preferable that it is programmable to the extent possible.

Below, a specific example of an embodiment will be explained.

When handling image data of 12-bit resolution, the data is divided to a higher-order side 8-bit part and a lower-order side 4-bit part, lossless compression in combination of a difference PCM and Huffman encoding based on neighbor correlation is adopted to the higher-order 8-bit part and uncompressed data (PCM) is adopted as it is to the lower-order side 4-bit part.

[Sixth Function]

To attain the goals (A) and (C), an optimal compression method is adaptively used for each block, so that deterioration of picture quality is suppressed to a minimum in a range of satisfying a targeted compression rate.

In a general image compression method, compression efficiency is high for a simple pattern but, it declines as the pattern becomes complicated, which is a factor in that the complexity of a pattern and the compression efficiency conflict.

On the other hand, a high compression rate and maintenance of a high bit resolution (maintenance of high picture quality) of pixels are also conflicting factors, and they are in a trade-off relation to each other.

A method of attaining a constant targeted compression rate regardless of the complexity of a pattern while suppressing the deterioration of picture quality to a minimum by taking the relation of the three factors "complexity of a pattern, compression efficiency and maintenance of high picture quality" into account is required.

In the present invention, a method of adaptively reducing the bit resolution of pixels in each block in accordance with the complexity of a pattern is applied.

By controlling a reduction degree of bit resolution to an optimal point so as to match with a targeted compression rate, a constant compression rate can be attained regardless of the complexity of a pattern and the deterioration of picture quality can be suppressed as much as possible.

In the present embodiment, an algorithm for extracting an optimal reduction point of bit resolution of pixels is not particularly limited. A specific algorithm example of the embodiment will be explained later on.

[Seventh Function]

To attain the goal (A), when reducing the bit resolution of pixels, a determination is made based on sizes of pixel values and the bit resolution of a low-brightness (pixel) value is made hard to reduced compared with that of a high-brightness (pixel) value, so that visual deterioration of the picture quality is prevented.

As an index used for reducing the bit resolution of pixels, a brightness (pixel) value may be mentioned.

Generally, from the visual characteristic that human eyes are sensitive to delicate tone changes in a dark part, a compression method for sustaining bit resolution of a low-brightness (pixel) value preferentially to that of a high-brightness (pixel) value becomes effective for maintaining a high picture quality.

Thus, in the present embodiment, a step-by-step algorithm is adopted wherein bit resolution of a pixel value on the low-brightness side included in a block is held as much as possible, lower-order bits are reduced little and little from a pixel value on the high-brightness side until attaining a targeted compression rate, and the reduction degree of the bit resolution is controlled to an optimal point for each block.

In the present embodiment, an algorithm for extracting bit resolution to be reduced for a size of a brightness (pixel) value is not particularly limited.

Below, a specific algorithm example of the embodiment will be explained.

An algorithm example for determining a reduction degree of data of a lower-order bit side part in accordance with a value of a higher-order bit side part of a pixel value will be explained.

First, data on the higher-order bit side is divided to some levels based on the value, and a conversion record for determining how many bits should be held in resolution of the lower-order bit side for each level is prepared.

Since the record is arranged in the compression efficiency order from a low compression rate to a high compression rate, compression with a high picture quality with the least bit reduction in a targeted compression rate becomes possible by successively adapting the record until the targeted compression rate is attained.

In the present embodiment, a level in the record and a value of reduced bit resolution, etc. are not particularly limited. It is preferable that these values are set according to the characteristics of the image data, so that they are preferably programmable to the extent possible.

[Eighth Function]

To attain the goal (C), the higher-order bit side is subjected to lossless compression for assuring the minimum picture quality, while when the results of all the reduction schemes are not good, the higher-order data are stored as is for assuring the minimum capacity after compression.

Variable length encoding methods include those using a static variable length table and those dynamically changing a variable length table according to the data.

A compression efficiency is high in the method of using a dynamic table, but very complex processing and time are required for that, which may impair the real-time property as an object of the method.

On the other hand, the method of using a static table brings an effect close to that in the method of using a dynamic table even with small circuit resources.

Therefore, a variable length encoding using a static variable encoding table is adopted in the present method.

A static variable length encoding table is set, so that an image with an average complexity degree can be efficiently compressed based on a variety of image statistic information. Therefore, in an image having the worst case static distribution by the setting, the data amount may inversely increase to that before the compression.

In that case, it is advantageous not to perform compression processing because the data amount becomes smaller than to perform compression processing using a static variable length encoding.

In the present method, data on the higher-order bit side before compression is rounded by a value on the lower-order bit side and used as data after compression in that case.

By not storing but reducing data on the lower-order bit side, the data capacity is compressed by a targeted compression rate or smaller.

Next, the band assuring compression method applied in the present embodiment explained above will be explained with reference to the drawings.

Here, the targeted compression rate is 66.7% (⅔ of the original data amount), which corresponds to the case of compressing 12 bits to 8 bits per one pixel average.

Figure 4:
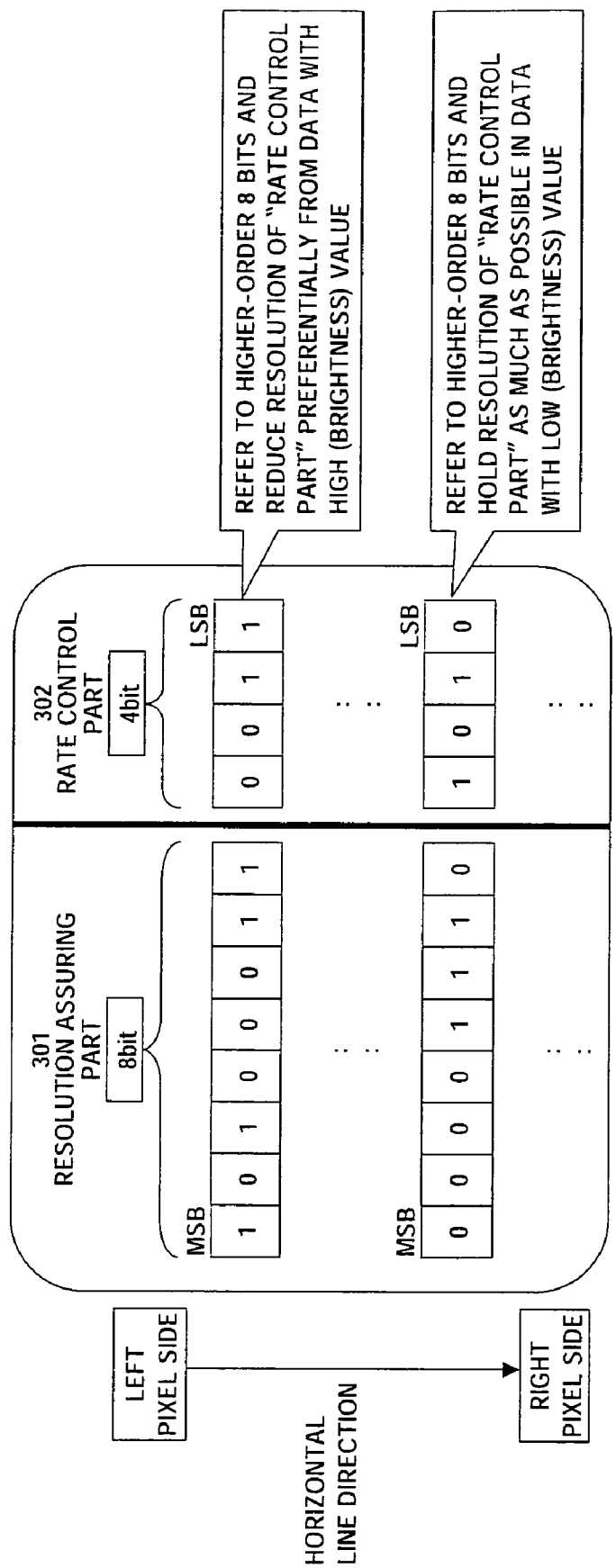
FIG. 4 is a view for explaining a band assuring compression method applied in the present embodiment, showing a state where 12-bit resolution pixel image data (RAW data) is divided to higher-order side bits and lower-order side bits.

FIG. 4 is a view for explaining a band assuring compression method applied in the present embodiment, showing a state where 12-bit resolution pixel image data (RAW data) is divided to two: higher-order side bits and lower-order side bits.

Figure 5:
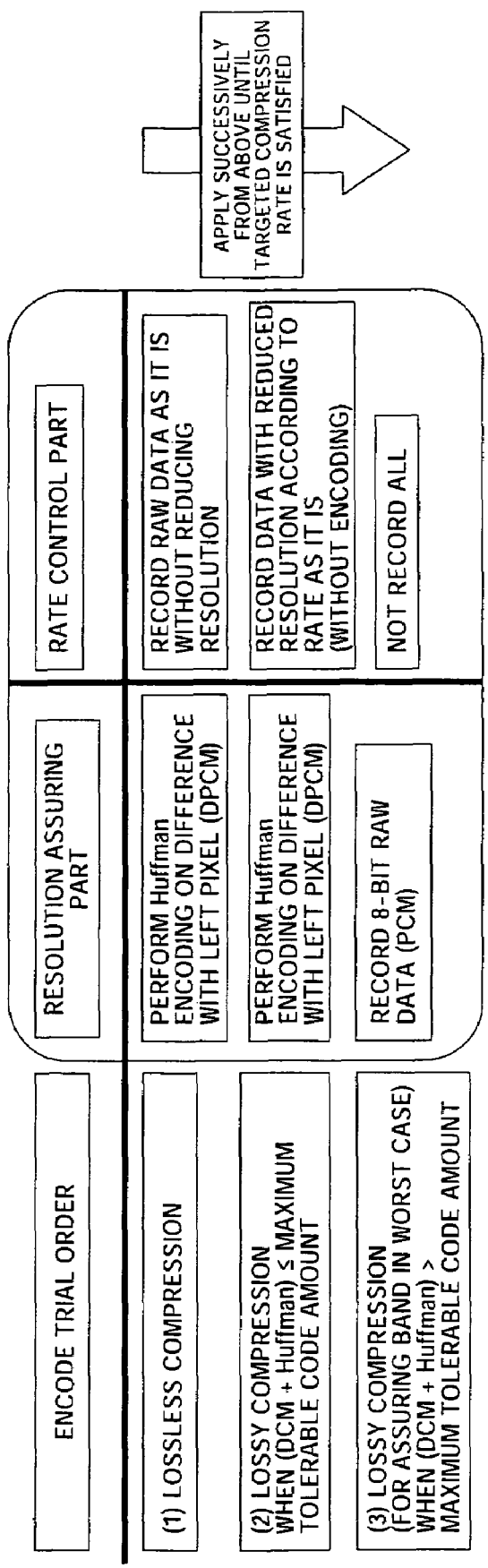
FIG. 5 is a view for explaining a band assuring compression method applied in the present embodiment, showing an encode algorithm to be applied after dividing pixel data into two.

FIG. 5 is a view for explaining a band assuring compression method applied in the present embodiment, showing an encode algorithm example to be applied after dividing pixel data into two.

Note that FIG. 4 shows one line (horizontal line) of the pixel arrays from the left side to the right side scanned in the vertical direction for convenience.

In the example in FIG. 4, 12-bit raw data is divided to a resolution assuring part 301 as the higher-order 8-bit part and a rate control part 302 as the lower-order 4-bit part, to which different encode algorithms are applied, respectively.

In the present embodiment, as shown in FIG. 4, the higher-order side 8 bits are referred to as resolution of the rate control part 302, and resolution of the lower-order side rate control part 302 is preferentially reduced from data with a high brightness value. Data with a low brightness value holds the resolution of the rate control part 302 as much as possible.

In the example in FIG. 4, as to whether the brightness value is high or low, 8 bits of the higher-order side resolution assuring part 301 is divided to the MSB side 4 bits and the LSB side 4 bits and, when any one of the MSB side 4 bits is set to be logical 1, the brightness value is determined to be high; while when none of the MSB side 4 bits is set to be 1, the brightness value is determined to be low.

That is an example, so variable embodiments can be adopted

To explain the trial order of encoding, as shown in FIG. 5, the resolution assuring part 301 as the higher-order side 8-bit part and the rate control part 302 as a lower-order side 4-bit part are respectively applied with different encode algorithms, and (1) lossless compression, (2) first lossy compression and (3) second lossy compression for assuring a band in the worst case are successively applied until the targeted compression rate is satisfied.

First, in the lossless compression processing step, the resolution assuring part 301 as the higher-order side 8-bit part is applied with lossless compression in combination of a difference PCM based on neighbor correlation and Huffman coding is applied, and the rate control part 302 as a lower-order side 4-bit part is applied with uncompressed data (PCM) as it is.

Next, in the first lossy compression processing step, lossless compression in combination of DPCM and Huffman coding is applied. When the encoding amount is smaller than the maximum tolerable encoding amount and does not reach the targeted compression rate, the resolution assuring part 301 as the higher-order side 8-bit part is applied with the lossy compression in combination of a difference PCM based on neighbor correlation and Huffman coding and the rate control part 302 as a lower-order side 4-bit part records data with reduced resolution according to the rate as it is without encoding.

In a second lossy compression processing step, lossless compression in combination of DPCM and Huffman coding as a processing for assuring a band in the worst case is applied and, when the encoding amount is larger than the maximum tolerable encoding amount and does not reach the targeted compression rate, 8-bit raw data (PCM) in the resolution assuring part 301 as the higher-order side 8-bit part is recorded as it is and not all of the rate control part 302 as a lower-order side 4-bit part is recorded.

Next, an example of an encoding method of the higher-order side bit component (resolution assuring part) and that of the lower-order side bit component (rate control part) in the present embodiment will be explained.

First, an example of the higher-order side bit component (resolution assuring part) will be explained.

FIG. 6 is a view for explaining an encoding method of higher-order side bit components (a resolution assured part) in the present embodiment.

As a basic compression method, a method of performing Huffman encoding on a difference between a current pixel and the previous pixel is applied.

As shown in FIG. 6A, first, by assuming that one line (one horizontal line) in the pixel arrays (input image data) is a block, data before compression is subjected to processing in the raster order in units of blocks.

Next, as shown in FIG. 6B, a difference of a previous pixel (prey pxl) stored in a holding part 303 and a current pixel (cur pxl) is obtained by a subtractor 304.

As shown in FIG. 6C, the obtained difference is encoded as shown in a Huffman table 305. The Huffman table normally becomes a triangular shape and the encoding length becomes shorter as the difference becomes smaller.

Next, as shown in FIG. 6D, to estimate about how much a compression rate of the higher-order side bit component becomes, the encoding length is accumulated in an accumulator 306.

Then, as shown in FIG. 6E, a compression rate of the higher-order side bit component is estimated for each block. As a result of the estimation, when the compression rate of the higher-order side bit component is the targeted compression rate or lower, the remaining bits are assigned to the lower-order side bit component. When the compression rate of the higher-order side bit component is higher than the targeted compression rate, processing (the previous pixel difference+ Huffman encoding) is not performed as the worst case and only the higher-order bit side component is stored by PCM.

Next, an example of an encoding method of the lower-order side bit component (a rate control part) will be explained.

FIGS. 7A to 7D are views for explaining an encoding method of lower-order side bit components (a rate control part) of the present embodiment.

As explained above, in the present embodiment, a brightness value is determined and processing of reducing the resolution of the rate control part 302 or maintaining the resolution as much as possible is performed in accordance with the brightness value.

In the present embodiment, when a brightness value is calculated, brightness information can be divided to a plurality of ranges in accordance with a range of the value.

To take an example, higher-order side 8-bit data may be divided to 8 ranges by section boundaries 2~0, 2~1, 2~2, . . . , 2~8 ("~" indicates factorial). The ranges are referred to as "brightness degree levels". In a later step, a resolution reduction degree of the pixel data will be determined in accordance with the brightness level.

When considering limited circuit resources, it is advantageous to divide the brightness value to tens of ranges in terms of a processing amount. It is needless to mention, but as far as a processing load permits, it may be handled as a brightness value, that is, as a brightness level, without dividing and input to continuous functions (FIG. 7B to FIG. 7D) for converting to a reduction degree. Conversion from a brightness level to a reduction degree in FIG. 7B to FIG. 7D will be explained.

In the present embodiment, as shown in FIG. 7A, a correspondence table (or function) of a brightness level and a compression degree is prepared. By referring to the table by inputting a brightness level, it is possible to obtain "a reduction degree" indicating how much resolution should remain in the lower-order side data.

In FIG. 7A, a numeric sequence of each line in a dotted box in the table is referred to as a "record". Each record corresponds to one reduction degree. In FIG. 7A, the upper record has the larger reduction degree, that is, the more the resolution reduction is. Basically, compression is checked successively from the record with the smaller reduction degree. One record corresponds to one reduction scheme.

In each record, the number of bits of the lower-order data after reduction can be obtained in accordance with the brightness degree as shown in FIG. 7B to FIG. 7D.

Here, in accordance with the visual characteristics of a human, the record is adjusted, so that the lower the brightness degree of input data is, that is, the darker the data is, the more the resolution is held by not lowering the reduction degree.

FIG. 7B to FIG. 7D show images like continuous functions being different from FIG. 7A. Functional processing may be performed if the system permits. The higher the reduction degree becomes, the larger the entire number of reduction bits including a low brightness part becomes.

In any case, a dividing method of the brightness level and a determining policy of the reduction degree in the table have an important role on maintaining the picture quality.

It is preferable that the table can be set to be variable and the set values are well reviewed through an evaluation by a requirement system.

When the reduction degree is obtained, the number of bits to remain in the lower-order side of the pixel is determined. When reducing bits, an amount of specified bits is reduced by rounding from the LSB side of the lower-order side data.

For example, when a record is selected according to a certain reduction degree and "3" is obtained as the number of bits of the lower-order bits after a reduction based on a brightness level of the currently handled higher-order data, since the original resolution of the lower-order data is 4 bits here, the number of bits after compressing from 4 bits becomes 3 bits.

One bit on the LSB side is reduced by rounding. By repeating this operation for all pixels in the block, a capacity of the lower-order data side after compression in the block can be performed by a trial calculation.

Figure 8:
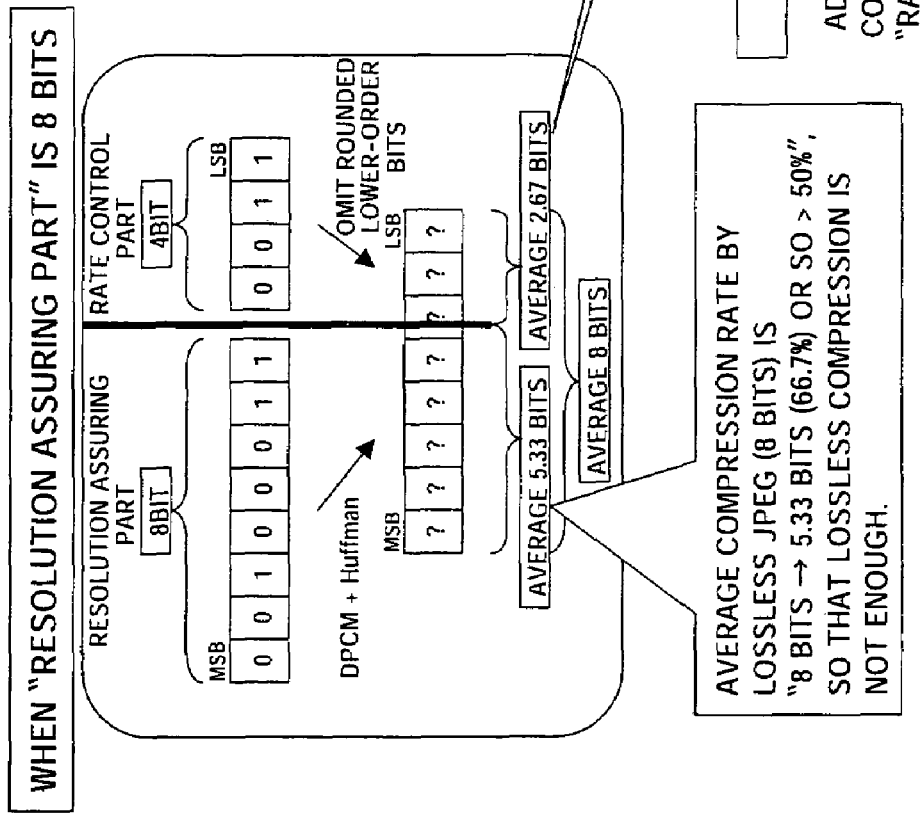
FIG. 8 is a view for explaining the reason why rounded lower-order bits omit processing (lossy compression) is necessary.

Here, the reason that the rounded lower-order bit reduction processing (lossy compression) is necessary will be explained with reference to FIG. 8.

As explained above, when the resolution assuring part 301 is 8 bits, an average compression rate by lossless compression is a degree that the 8-bit part becomes 5.33 bits (66.7%) or so. However, depending on cases, the compression rate becomes lower than this.

Thus, in the present embodiment, processing for adjusting the targeted compression rate is performed in the rate control part 302. In this example, lossy compression (rounded lower-order bit reduction) for compressing an average 4 bits to 2.67 bits (66.7%) or so in the rate control part 302 is necessary.

FIG. 9 is a view of an outline of processing of the band assuring compression method of the present embodiment explained above.

In the band assuring compression method of the present embodiment, as shown in FIG. 9A, one image is divided to blocks as processing units, each block is compressed as shown in FIG. 9B, a targeted compression rate of a % is attained in each block, and a code of each compressed block is arranged in the image memory 17 as shown in FIG. 9C.

If an arrangement region (a capacity a %) is secured for each block, a random access to the image memory 17 becomes possible in units of blocks from the top pixel.

In the image memory 17, as shown in FIG. 9D, a top address of each block is fixed and a random access is always possible in units of blocks. Also, the compression efficiency is high and, when it is below a %, all of a region for each block is not used up. Furthermore, a capacity secured for each block is "an original block capacity" multiplied with a %, that is, a capacity after compression is assured by a %, so that it is not off from the region.

Next, a specific configuration example and operation of the band assuring compression expansion unit 200 in the digital signal processing unit 15 of the present embodiment will be explained.

Figure 10:
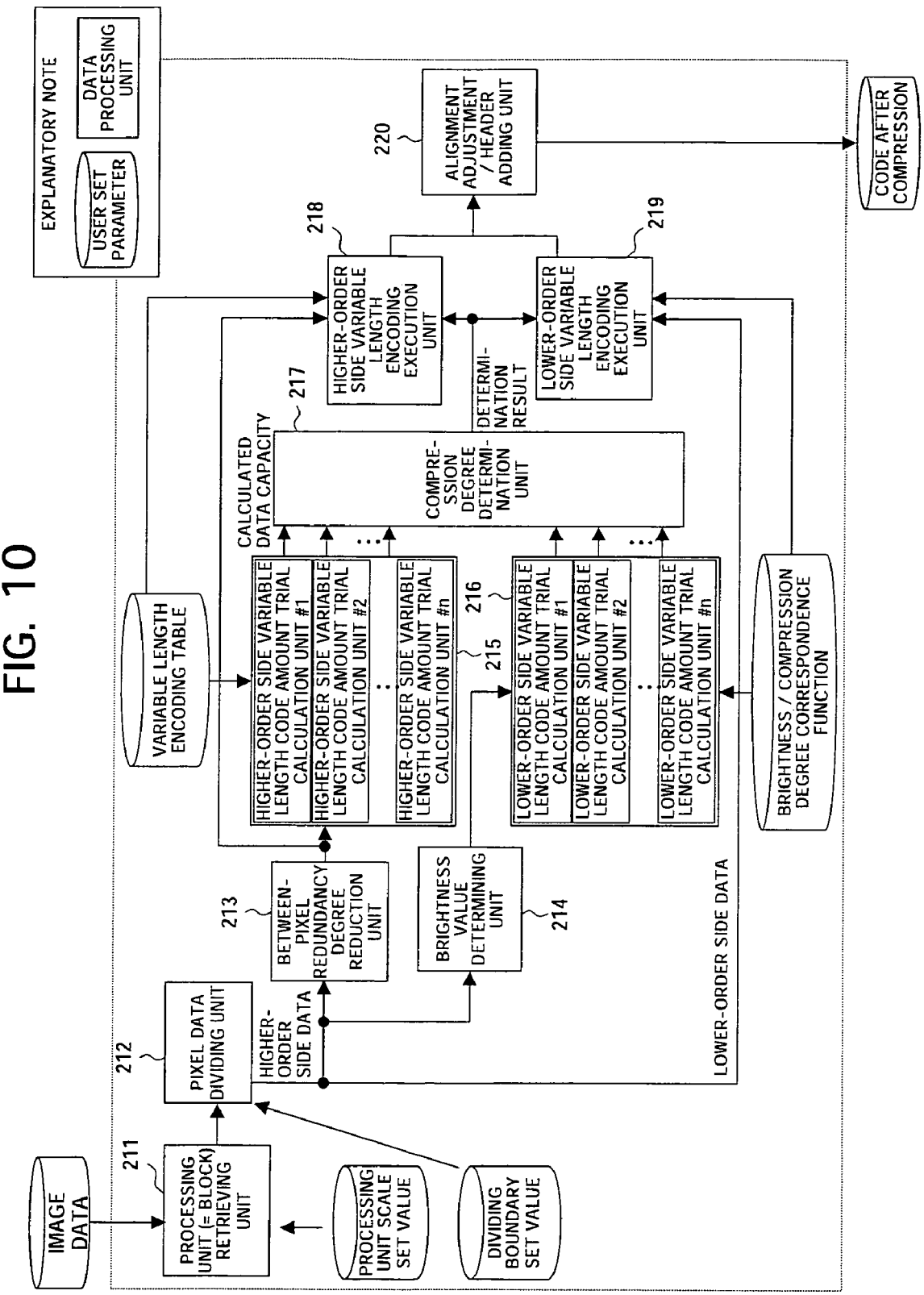
FIG. 10 is a block diagram of a specific configuration example of the band compression expansion unit of the present embodiment.

FIG. 10 is a block diagram of a specific configuration example of the band compression expansion unit 200 of the present embodiment.

The band assuring compression expansion unit 200 in FIG. 10 is a specific example in the transmission side block 201 in FIG. 3 and mainly includes a processing unit (block retrieving unit) 211, a pixel data dividing unit 212, a between-pixel redundancy degree reduction unit 213, a brightness value determining unit 214, a higher-order side trial calculation unit 215, a lower-order side trial calculation unit 216, an applying compression degree determination unit 217, a higher-order side variable length encoding execution unit 218, a lower-order side variable length encoding execution unit 219, and an alignment adjustment/header adding unit 220.

The processing unit retrieving unit 211 obtains a unit of the number of pixels based on a processing unit scale set value, which is set in advance, and outputs to the pixel data dividing unit 212.

The obtained unit is referred to a block, and a desired compression rate is attained in each block. The number of blocks and the shape of each block are preferably set to be variable.

The pixel data dividing unit 212 divides the obtained block image data to a resolution assuring part 301 as the higher-order side 8 bits and a rate control part 302 as the lower-order side 4 bits, outputs the higher-order side bit data to the between-pixel redundancy degree reduction unit 213 and outputs the lower-order bit data to the lower-order side variable length encoding execution unit 219.

The between-pixel redundancy degree reduction unit 213 performs redundancy degree reduction processing unique to the image by referring to peripheral pixel data and outputs the results to the upper-order side trial calculation unit 215.

In this method, the reduction processing method of the redundancy degree and a data format after the reduction processing are not regulated, but as an example, a DPCM method for reducing a redundancy by subtraction between immediately adjacent pixels may be mentioned.

This method is used as a redundancy degree reduction means of a DCT coefficient DC component in the JPEG standard. Also, in the case of color filter array data, a method of particularly utilizing a redundancy degree between the same colors is preferable.

The brightness value determining unit 214 converts the higher-order side data from the pixel data dividing unit 212 to a value indicating the brightness and outputs the result to the lower-order side trial calculation unit 216.

The higher-order side trial calculation unit 215 refers to a variable length encoding table to estimate a capacity after encoding for the data with a reduced redundancy degree, and outputs the results to the compression degree determination unit 217.

The lower-order side trial calculation unit 216 receives as an input the brightness level, refers to the correspondence table (or functions) of a brightness level and compression degree, obtains "a reduction degree" indicating how much resolution should remain in the lower-order side data, and outputs the results to the compression degree determination unit 217.

The compression degree determination unit 217 gradually increases the compression degree until the compression rate reaches the targeted rate, determines a compression degree at the time of reaching to the target as successful for application, and outputs the determination results to the higher-order side variable length encoding execution unit 218 and the lower-order side variable length encoding execution unit 219.

The higher-order side variable length encoding execution unit 218 receives the determination result by the compression degree determination unit 217, and actually performs compression processing on the higher-order side data based on the compression degree to be applied to create compressed encoding data. The higher-order side data is subjected to lossless compression by variable length encoding. As the lossless variable length encoding, the Huffman encoding may be mentioned as a typical example.

The lower-order side variable length encoding execution unit 219 successively reduces the number of bits of the lower-order side data in each pixel based on the correspondence table of a brightness level and a compression degree to perform lossy compression, and creates a code by simply connecting the thus reduced data.

The alignment adjustment/header adding unit 220 adds data required for decoding as a header to the pixel data encoding, completes a final compressed code, and transmits the same to the image memory 17 through the bus 25.

Below, an operation of the band assuring compression expansion unit 200 having the above configuration will be explained in detail with reference to the flowchart in FIG. 11.

Note that, as a prerequisite, image data by a color filter array having 12-bit resolution in each color is assumed to be compressed to 8 bits in each color.

First, image data in an amount of a unit of the predetermined number of pixels is retrieved by the block (processing unit) retrieving unit 211 (ST1). A desired compression rate is attained for each block.

Pixels in the retrieved block data are respectively divided to a higher-order bit side and a lower-order bit side in the pixel data dividing unit 212 (ST2).

Here, it is assumed that the higher-order side is 8 bits and the lower-order side is 4 bits. The dividing method is simply dividing into two at a boundary of the bits, and the original form can be restored simply by connecting the higher-order side and the lower-order side. The dividing boundary closely relates to the maximum value of a capacity after compression and the minimum image quality.

Namely, the maximum value of the capacity after compression is equivalent to a capacity of the higher-order side bits, and the minimum image quality becomes the resolution in an amount of the number of bits of the higher-order side.

In the present example, a compression rate and an image quality equivalent to 8 bits per one pixel are targeted finally, so that such a boundary is set. To deal with a variety of use and objects, the boundary position is preferably set freely.

The higher-order side data retrieved by the pixel data dividing unit 212 is converted to a value indicating brightness in the brightness value determining unit 214.

In the case of the color filter array assumed here, a value of the higher-order side data may be handled as it is as brightness. To calculate the brightness value more accurately, a calculation including peripheral pixel data may be performed. Brightness components of the brightness and a color difference expression (YC), etc. are good examples of the calculation result here.

When calculating a brightness value, brightness information is divided to a plurality of ranges in accordance with a range of the value.

For example, as explained above, the higher-order side 8-bit data is divided to eight ranges (brightness levels) divided at section boundaries of $2\textasciitilde0, 2\textasciitilde1, 2\textasciitilde2, \ldots, 2\textasciitilde8$ ("~" indicates factorial). In a later step, a resolution reduction degree of the pixel data will be determined in accordance with the brightness level.

When considering limited circuit resources, it is advantageous to divide the brightness value to tens of ranges in terms of a processing amount. It is needless to mention, but as far as a processing load permits, it may be handled as a brightness value, that is, as a brightness level, without dividing and input to continuous functions (FIG. 7B to FIG. 7D) for converting to a reduction degree.

The brightness level obtained in the brightness value determining unit 214 is input to the lower-order side trial calculation unit 216. Here, a correspondence table (or function) of a brightness level and a compression degree as shown in FIG. 7A is prepared. By referring to the table by inputting a brightness level, it is possible to obtain "a reduction degree" indicating how much resolution should remain in the lower-order side data (ST3).

A numeric sequence of each line in a dotted box in the table in FIG. 7A is referred to as "a record". Each record corresponds to one reduction degree. In FIG. 7A, the upper record has the larger reduction degree, that is, the more the resolution reduction is. Basically, compression is checked successively from the record with the smaller reduction degree. One record corresponds to one reduction scheme.

In each record, the number of bits of the lower-order data after reduction can be obtained in accordance with the brightness degree as shown in FIG. 7B to FIG. 7D.

Here, in accordance with the visual sense characteristics of a human, the record is adjusted, so that the lower the brightness degree of input data is, that is, the darker the data is, the more the resolution is held by not lowering the reduction degree.

A dividing method of the brightness level and a determining policy of the reduction degree in the table here have an important role in maintaining the picture quality.

It is preferable that the table can be set to be variable and the set values are well reviewed through an evaluation by a requirement system.

When the reduction degree is obtained, the number of bits to remain in the lower-order side of the pixel is determined. When reducing bits, an amount of specified bits is reduced by rounding from the LSB side of the lower-order side data.

For example, when a record is selected according to a certain reduction degree and "3" is obtained as the number of bits of the lower-order bits after a reduction based on a brightness level of the currently handled higher-order data, since the original resolution of the lower-order data is 4 bits here, the number of bits after compressing from 4 bits becomes 3 bits.

One bit on the LSB side is reduced by rounding. By repeating this operation for all the pixels in the block, a capacity of the lower-order data side after compression in the block can be performed by a trial calculation.

Figure 11:
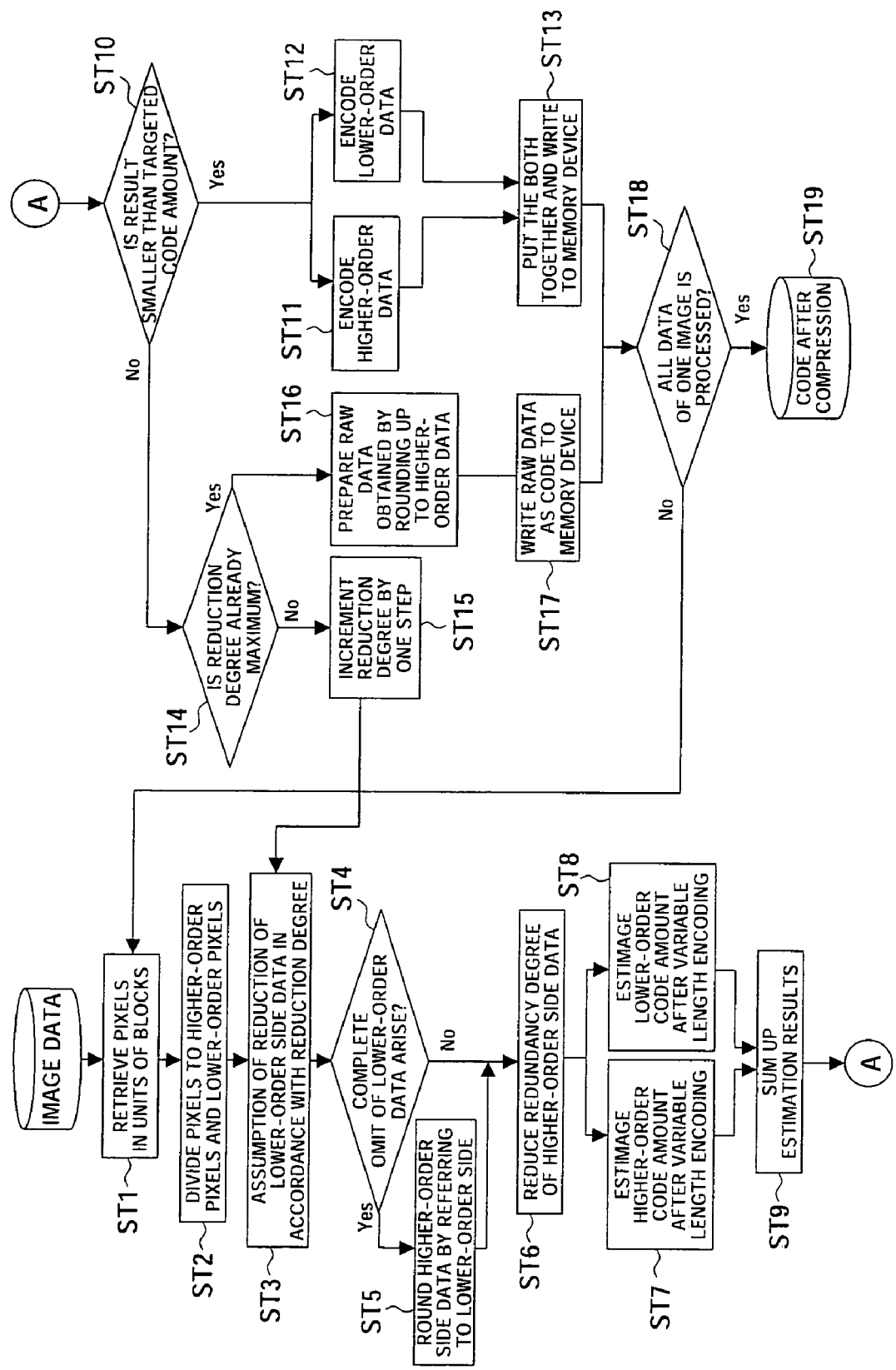
FIG. 11 is a flowchart for explaining an operation of the band compression expansion unit in FIG. 10.

When considering from a viewpoint of an algorithm, as in the flowchart in FIG. 11, the trial calculation of a capacity after compression is performed successively from a scheme with the smaller reduction degree until the calculation result reaches the targeted value.

However, when considering hardware mounting to a dedicated circuit on an integrated circuit, as shown in FIG. 10, each reduction scheme, that is, for each number of records in the table, trial calculation devices of a capacity after compression may be provided in parallel.

In an example in FIG. 10, n-number of the trial calculation devices 216-1 to 216-n are prepared in parallel. As a result, the results of all reduction schemes can be obtained at a time taken for performing only one trial calculation, so that it becomes very advantageous in terms of speed performance.

Note that the processing unit is referred to as a "trial calculation unit" in prospect of the parallel processing by the dedicated circuits. Here, a data capacity after compression is calculated, but encoding processing for obtaining actual compressed data is not performed.

Actual encoding processing can be performed only on data applied with a reduction scheme. Consequently, it is sufficient to provide accumulators (accumulation adding result storage devices) in parallel only for adding trial calculations of pixels in an amount of one block to the trial calculation unit, and it is possible to improve the speed by parallel processing and to reduce circuit resources at a time.

In the present method, the trial calculation units do not have to be made parallel, however, it is a strongly recommended configuration.

Up until now, a capacity of the lower-order side data after compression could be obtained. Note that there is no need to refer to the lower-order side data so far.

Next, trial calculation of a capacity of the higher-order side data after compression will be performed.

Depending on the results of an encoding trial calculation of the lower-order side data, all of the bits in the lower-order side data may be determined to be reduced.

In that case, if all of the lower-order side data is simply omitted, the remaining higher-order side data becomes a value obtained not by rounding but by simply omitting the lower-order side data, which gives an effect on the image quality.

Accordingly, as is indicated in the flowchart, when there arises lower-order data to be completely omitted, it is recommended that the most significant bit of the lower-order side data is referred to and subjected to rounding processing so as to be rounded off or rounded up to the higher-order side bits. Higher-order side bits obtained by the rounding processing become data to be encoded (ST4 and ST5).

The higher-order data after being subjected to the rounding processing by referring to the lower-order side data is transmitted to the between-pixel redundancy degree reduction unit 213.

In the between-pixel redundancy degree reduction unit 213, redundancy degree reduction processing unique to an image is performed by referring to peripheral pixel data. In this method, the reduction processing method of the redundancy degree and a data format after the reduction processing are not regulated but, as an example, a DPCM method for reducing the redundancy degree by subtraction between immediate adjacent pixels may be mentioned.

Estimation of a capacity after encoding is made on data after the redundancy degree reduction in the higher-order side trial calculation unit 215.

Here, the compression method is lossless compression. Still, actual encoding is not yet performed and only a trial calculation of a data capacity after variable length encoding is performed.

For example, in the case of Huffman encoding, if a Huffman table is given, an encoding length assuming encoding can be obtained without creating an actual code. The thus obtained encoding lengths are added up in an amount of one block for each data, and the result is a higher-order side encoding trial calculation result of the block.

It is also effective to make the trial calculation devices parallel, and only by being provided with accumulators and not being provided with an actual encoding processing unit, the trial calculation result can be obtained.

From the above, the data capacities of compressed codes were calculated for both the higher-order side and the lower-order side.

The calculation results are summed up in the compression degree determination unit 217, (ST9). The sum is compared with a data capacity determined as the initial targeted compression rate (ST10).

When a data amount as the calculation result is smaller (not larger) than the targeted data amount, that is, when the aim is achieved, a reduction degree in the calculation of the compression is determined successful and applied.

When the aim is not achieved, the reduction degree is incremented one step to pursue a compression scheme with a higher efficiency. Namely, a trial calculation of a capacity after compression is again performed for the higher-order side and the lower-order side for a compression scheme with less resolution. An operation of one-step incrementing the reduction degree corresponds to using a record with a one-step higher reduction degree in the table image in FIG. 7A.

As explained above, in the compression degree determination unit 217, the compression degree is gradually incremented until the compression rate reaches the targeted value, and a compression degree at the time of reaching the targeted value is determined to be successful and applied. When actually mounting as a logic circuit, as shown in FIG. 10, encoding amount trial calculation units for calculating results in respective compression schemes are provided in parallel.

As a result, in the compression degree determination unit 217, trial calculation results of the respective compression schemes can be obtained at a time and determination of the application of the compression schemes can be made at a time.

The case where the reduction degree is the lowest is when not a bit of the lower-order side data is reduced in addition to lossless compression on the higher-order side, and this case is complete lossless encoding as a whole.

On the other hand, there may be the case of not reaching the targeted compression rate even if the compression degree is incremented to the maximum of the defined range. In this case, compression of data is given up and the original data format is handled as the encoded data. The details will be explained later on.

When a compression scheme to be applied in the compression degree determination unit 217, is determined, actual data is actually subjected to compression processing to create compressed encoded data based on a compression degree of the scheme in the higher-order side variable length encoding execution unit 218 and the lower-order side variable length encoding execution unit 219.

The higher-order side data is subjected to lossless compression by variable length encoding. As the lossless variable length encoding, the Huffman encoding may be mentioned as a typical example (ST11).

The lower-order side data is subjected to lossy compression, by which the number of bits is reduced in each pixel based on the table in FIG. 7A, then, the reduced data are simply connected to create a code. At this time, instead of simply connecting the reduced data, a code may be created by performing any compression means (ST12).

While normal data compression steps are as explained above, there is processing for the case that the targeted value is not attained by all compression schemes in the compression degree determination unit 217.

In this case, data on the higher-order side will be written as it is in the code. In the present example, the higher-order side data in an amount of 8 bits is written as it is to the code, but a condition of the compression rate of attaining 8 bits per one pixel can be satisfied.

The thus written higher-order side data should be obtained not only by omitting data in an amount of the number of higher-order side bits from the original data, but by rounding up the original data to the higher-order 8 bits by considering the lower-order side data.

As explained above, when encoding of the pixel data is completed, data required for decoding, etc. is added as a header to the pixel data code in the alignment adjustment/header adding unit 220, so that the final compressed code is completed.

Compressed codes are adjusted in alignment based on a memory device to be written to and a data bus width to reach to the memory device and written to the memory device. The above steps are repeatedly performed for each block for an amount of one image (ST10 to ST19).

The minimum necessary content of added data is information required for decoding. Information required for decoding is first roughly divided into two. One is information in common for the entire image data, and the other is information unique for each block.

The common information for the entire image data is, for example, information on the table used for encoding. If information on the respective tables for compressing the higher-order side and the lower-order side is not recorded in the codes, expansion becomes impossible when decoding.

If the tables are used as being fixed for the convenience of use by a system, as far as it is regulated on the encoding side and the decoding side, recording of the table information on the codes becomes unnecessary.

Other than that, the common information for the entire image data may include a time stamp, etc., but these are not essential information and may be added in accordance with the system or the case.

As the unique information for each block, there are two essential items. First, as a storing format, a flag indicating whether compressed data is encoded or the original data as it is was encoded without compression. The second item is a value indicating a reduction degree of the compression when compressed data is written in a block indicated as the first item. On the decoding side, by matching the value with the table at the time of compression, an expansion of the lower-order side data can be made.

Finally, when writing encoded data in the memory device, writing is performed from an address position determined for each block (refer to FIGS. 9A to 9D). A size of a region assigned to each block in the memory device is for an amount of encoded data in the case of the worst compression efficiency, that is, an amount of targeted capacity after compression.

As a result, when reading the data, a cue in units of blocks becomes possible and a random access in units of blocks becomes possible. On the reading side, by reading a block including a targeted pixel from the top and expanding the same, the pixel can be obtained.

As explained above, according to the present embodiment, as a result that the data signal processing unit 15 is provided with the band assuring compression expansion unit 200 at the interface part with the image memory 17, and compression processing is performed by dividing image data to higher-order side bits and lower-order side bits and adapting a predetermined compression method to each divided part; processing close to 1-path processing can be performed without deteriorating the picture quality or taking too much processing time while assuring the memory bus band, a capacity required for a compression rate, band and storage in the worst case is provided and, moreover, a random access property is secured.

Accordingly, in the present embodiment, the following effects can be obtained.

A memory area for storing an image can be reduced to an assured certain amount or smaller.

A bus band for transmitting an image can be reduced to an assured certain amount or smaller.

A random access property to any aligned partial region in an image can be maintained.

The minimum quality and resolution of an image can be assured.

By changing a reduction degree of resolution according to the brightness of pixels, perceptual deterioration of the image quality can be suppressed.

As a result that resolution is variable to be adaptive based on a difficulty level of compression determined by the complexity of an image, a targeted compression rate can be attained while maintaining the image quality.

The above explained processing can be performed in real time with small circuit resources.

It should be understood by those skilled in the art that various modifications, combinations, sub-combinations and alternations may occur depending on design requirements and other factors insofar as they are within the scope of the appended claims or the equivalents thereof.

What is claimed is:

1. A camera system, comprising:
an image capturing unit for taking an image of an object and outputting image data, and
an image signal processing apparatus performing predetermined processing on the image data;
wherein the image signal processing apparatus includes a signal processing unit dividing input image data to a plurality of bit resolution parts and performing a compression processing by adopting a predetermined compression method to each divided part,
wherein the signal processing unit divides image data to higher-order side bits and lower-order side bits, and performs a lossless compression on the divided higher-order side bits based on a lossless compression method, and
wherein the signal processing unit performs a band compression processing for attaining a targeted compression rate, performs a lossless compression on the divided lower-order side bits when the targeted compression rate is attained by a compression processing based on a lossless compression method, and performs a compression processing on the divided lower-order side bits based on a lossy compression method only when the targeted compression rate is not satisfied by the lossless compression.

2. A camera system as set forth in claim 1, wherein the signal processing unit compresses input image data in units of blocks of a predetermined number of pixels.

3. A camera system as set forth in claim 2, wherein the signal processing unit performs a band compression processing for attaining a targeted compression rate for each block, performs a lossless compression when the targeted compression rate is attained by a compression processing based on a lossless compression method, and performs a compression processing based on a lossy compression method only when the targeted compression rate is not satisfied by the lossless compression.

* * * * *